(12) United States Patent
Chang et al.

(10) Patent No.: US 8,730,624 B2
(45) Date of Patent: May 20, 2014

(54) ELECTROSTATIC DISCHARGE POWER CLAMP WITH A JFET BASED RC TRIGGER CIRCUIT

(75) Inventors: Shunhua T. Chang, South Burlington, VT (US); Kiran V. Chatty, Williston, VT (US); Robert J. Gauthier, Jr., Hinesburg, VT (US); Junjun Li, Williston, VT (US); Rahul Mishra, Essex Junction, VT (US); Mujahid Muhammad, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 13/076,625

(22) Filed: Mar. 31, 2011

(65) Prior Publication Data

US 2012/0250195 A1   Oct. 4, 2012

(51) Int. Cl.
*H02H 9/00*   (2006.01)

(52) U.S. Cl.
USPC .......................................................... 361/56

(58) Field of Classification Search
USPC .......................................................... 361/56
See application file for complete search history.

(56) References Cited

U.S. PATENT DOCUMENTS

| 5,559,659 A * | 9/1996 | Strauss .......................... 361/56 |
| 5,774,318 A * | 6/1998 | McClure et al. ................ 361/56 |
| 5,789,951 A | 8/1998 | Shen et al. |
| 6,239,958 B1 * | 5/2001 | Kato et al. ....................... 361/56 |
| 6,304,130 B1 * | 10/2001 | Poulin et al. ................... 327/430 |
| 6,455,902 B1 * | 9/2002 | Voldman ........................ 257/378 |
| 6,570,746 B1 | 5/2003 | Smith |
| 7,164,565 B2 * | 1/2007 | Takeda ............................ 361/56 |
| 7,209,332 B2 * | 4/2007 | Stockinger et al. ............. 361/56 |
| 7,245,468 B2 * | 7/2007 | Griesbach et al. .............. 361/56 |
| 7,265,529 B2 | 9/2007 | Nazarian |
| 7,324,315 B2 | 1/2008 | Harris |
| 7,764,137 B2 | 7/2010 | Hamlin |
| 8,014,118 B2 * | 9/2011 | Ikegami et al. ............... 361/111 |
| 2006/0187595 A1 * | 8/2006 | Botula et al. .................... 361/56 |
| 2011/0127586 A1 * | 6/2011 | Bobde et al. .................. 257/262 |

OTHER PUBLICATIONS

IBM et al. (Integrated Primary and Secondary Electrostatic Discharge (ESD) Protection using Junction Gate-Field Effect Transistor (JFET).*

* cited by examiner

*Primary Examiner* — Stephen W Jackson
*Assistant Examiner* — Rasem Mourad
(74) *Attorney, Agent, or Firm* — Schmeiser, Olsen & Watts; Michael LeStrange

(57) ABSTRACT

An ESD power clamp circuit and method of ESD protection. The ESD power clamp circuit includes: a power clamp device coupled to a resistive/capacitive (RC) network, the RC network including a capacitor as the capacitive element of the RC network and one or more junction field effect transistors (JFETs) configured as variable resistors as the resistive element of the RC network.

12 Claims, 3 Drawing Sheets

ELECTROSTATIC DISCHARGE POWER CLAMP WITH A JFET BASED RC TRIGGER CIRCUIT

FIELD OF THE INVENTION

The present invention relates to the field of integrated circuits; more specifically, it relates to an electrostatic discharge power clamp with a junction field effect transistor based resistive/capacitive network.

BACKGROUND

To protect integrated circuits from damage due to electrostatic discharge events, electrostatic discharge power clamp circuits are used. Traditional electrostatic discharge power clamp circuits require relatively long amounts of time to reset putting the circuits being protected at risk during consecutive electrostatic discharge events. Schemes to reduce this reset time result in the trigger portion of the electrostatic discharge power clamp circuits being overly sensitive to noise causing false triggers. Accordingly, there exists a need in the art to mitigate the deficiencies and limitations described hereinabove.

SUMMARY

A first aspect of the present invention is an electrostatic discharge power clamp circuit, comprising: a power clamp device coupled to a resistive/capacitive (RC) network, the RC network including a capacitor as the capacitive element of the RC network and one or more junction field effect transistors (JFETs) configured as variable resistors as the resistive element of the RC network.

A second aspect of the present invention is a method, comprising: providing an electrostatic discharge power clamp circuit, comprising: a trigger circuit comprising at least one junction field effect transistor connected between a power pad and a first plate of a capacitor and connected to an input of a buffer circuit, the input of the buffer circuit connected to the first plate of the capacitor; and a current by-pass device connected between the power pad and ground, to an output of the buffer circuit and to a second plate of the capacitor; charging the capacitor during an electrostatic discharge event, the charged capacitor turning on the current by-pass device to discharge current from the power pad to ground during the electrostatic discharge event; and discharging the capacitor through internal diodes of the one or more junction field effect transistors to the power pad when the electrostatic discharge event ends.

These and other aspects of the invention are described below.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION

Figure 1:
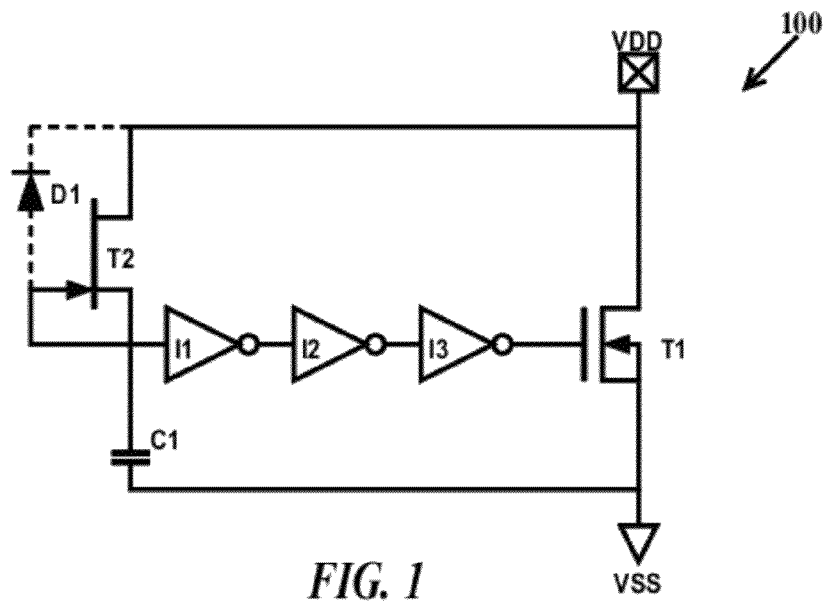
FIG. 1 is a circuit diagram of a first electrostatic discharge power clamp circuit according to embodiments of the present invention.

There are three general types of electrostatic discharge (ESD) events that have been commonly modeled: the human body model (HBM), the machine model (MM) and the charged device model (CDM). The HBM and MM represent discharge current between any two pins (e.g., pads) on an integrated circuit (IC) as a result of (respectively) a human body discharging through the IC and an electrically conductive tool discharging through the IC. Whereas a human body discharge is relatively slow in terms of rise time and has, for example, a unidirectional current of about 1-3 amps. A tool discharge is a relatively rapid event compared with HBM that, in one example, produces a bi-directional current into and out of the pins of about 3-5 amps. In the CDM, the ESD event does not originate from outside the IC, but instead represents a discharge of a device within the IC to ground (e.g., VSS). The IC is charged through the triboelectric effect (friction charging) or by external electrical fields. The CDM is a very rapid event compared with HBM. ESD events cause high currents to flow through devices of ICs that damage the devices. For example, with field effect transistors, the PN junctions and gate dielectrics can be damaged and interconnects between devices can be damaged.

A problem with traditional resistive/capacitive (RC) triggered ESD power clamp circuits that use a metal-oxide-silicon field effect transistor (MOSFET) as the resistive element of the RC trigger is once the ESD power clamp circuit is triggered by an ESD event, the ESD power clamp circuit is not useable until the RC trigger resets after the time delay required to discharge the RC timing capacitor through the RC resistor or MOSFET. HBM and CDM studies show that when the traditional ESD power clamp circuits undergo quick consecutive ESD events, less than full ESD protection is provided. The delay is severe enough that complex MOSFET networks are often used to reduce the delay. Another problem with traditional resistive/capacitive (RC) triggered ESD power clamp circuits that use polysilicon or metal resistor is the large chip area needed to achieve the high resistance required for the necessary on-time. The embodiments of the present invention utilize junction-field effect transistors (JFETs) as a unique automatically variable resistive element in the RC trigger circuit of an electrostatic discharge (ESD) power clamp circuit which reduce the reset time, use less chip area and provide additional benefits that can not be provided by ESD power clamp circuits which use polysilicon/metal resistors or MOSFET based resistors.

When used in the power clamp circuits according to embodiments of the present invention, the drain of the JFET is connected to VDD, and the gate and source of the FET are connected to the timing capacitor. The following discussion should be understood in this context. The drain-to-source resistance of JFET is a function of the drain-to-gate voltage.

During an ESD event, a positive pulse is applied to the power terminal and the JFETs gate-to-drain PN junction is maximally reverse biased initially. This reverse bias pinches off the channel and the JFET acts as a high impedance resistor similar to the case of a regular RC power clamp. The high resistance is desired in this situation as it keeps the ESD power clamp on long enough to dissipate incoming ESD energy. The advantages of using the JFET as compared to other resistive elements are small area compared to traditional back-end-of-line metal resistor and the fact JFETs do not suffer delayed turn-on compared to MOSFETs. Another advantage of the JFET as a resistive element in the RC network stems from the fact that a JFET can quickly discharge the timing capacitor to VDD through the internal gate-to-drain diodes to restore the timing capacitor to its pre-triggered initial state.

During normal circuit operation the clamp is not triggered and the timing capacitor voltage reaches the input voltage level. In this case the JFET is operated in the linear region with its channel open and acts as a low impedance resistor. The low resistance is also desired during normal operation mode as it reduces the susceptibility of the ESD power clamp to noise and therefore false triggering.

Because the JFET is automatically functioning at the optimal resistance during both normal operation and during ESD events improved overall ESD power clamp circuit performance is provided compared to ESD power clamp circuit using other resistive elements (e.g., MOSFET based resistors, polysilicon resistors and metal resistors and other resistive elements).

A direct current (DC) power supply has two terminals. The more positive terminal may be designated VDD and the other terminal may be designated VSS. Thus, VDD is more positive than VSS and VDD may be considered power and VSS may be considered ground. VSS/ground may be a positive, zero or negative potential so long as VDD is more positive than VSS. A positive voltage is a voltage having a potential greater than zero and a negative voltage is a voltage having a potential less than zero. Integrated circuit power supply pads and power supply lines (commonly called power rails) use the same terminology as that of the power supply terminal they are connected to or intended to be connected to. While the terms VDD and VSS will be used in describing the embodiments of the present invention, it should be understood that the terms "positive" or "power" may be substituted for VDD and the terms "negative" or "ground" may be substituted for VSS.

FIG. 1 is a circuit diagram of a first electrostatic discharge power clamp circuit according to embodiments of the present invention. In FIG. 1, an ESD power clamp circuit 100 is connected between a power pad (VDD) and ground (VSS). ESD power clamp circuit 100 includes a current by pass device embodied as an n-channel MOSFET T1 (NFET), a buffer circuit embodied as inverters I1, I2 and I3, and a trigger circuit embodied as a n-channel JFET T2 (nJFET) and a capacitor C1. JFET T2 includes an internal diode D1 shown connected by dashed lines. nJFET T2 is the resistive element of an RC trigger circuit that includes capacitor C1.

In FIG. 1, the drain of NFET T1 is connected to VDD and the source and body of NFET T1 are connected to VSS. The drain of nJFET T2 is connected to VDD and the gate and source of nJFET T2 is connected to a first plate of capacitor C1. The second plate of capacitor C1 is connected to VSS. The input of inverter I1 is connected to the source of nJFET T2, the output of inverter I1 is connected to the input of I2, the output of inverter I2 is connected to the input of inverter I3, and the output of inverter I3 is connected to the gate of NFET T1. Internal diode D1 is the PN junction between the P-doped gate region and N-doped drain region of nJFET T2 (see FIG. 2). Circuit wise the cathode of diode D1 is connected to VDD and the anode of diode D1 is connected to the first plate of capacitor C1 and the input of inverter I1. While three inverters are illustrated in FIG. 1, there may be more or less invertors connected in series. Inventors I1, I2 and I3 comprise an exemplary buffer circuit and other types of buffer circuits may be used (e.g., voltage buffers, current buffers, impedance matching or transforming buffers)."

During normal operation (power on/VDD high, no ESD event) the resistance of nJFET T2 is low because the drain, gate and source of the JFET are near the same potential reducing drain-to-source impedance. The resistance of the JFET during normal operation can be calculated using the basic resistance equation where the resistance is a function of the channel resistivity and the geometrical dimensions of the channel. During an ESD event on the VDD supply the resistance of nJFET T2 is higher because the gate-to-drain PN junction is maximally reverse biased, reducing the effective channel width and pinching off the current passing through nJFET T2. The resistance of a reverse biased JFET is determined by the saturation current and the applied pulse voltage. When the ESD event is over capacitor C1 discharges through diode D1 to VDD. It is the automatic switching between high and low resistance of nJFET T2 that distinguishes the nJFET/capacitor RC trigger circuit from other RC trigger circuit designs.

The resistance of nJFET T2 is a function of the length of the channel region of nJFET T2. Increasing the channel length of nJFET T2 will increase the channel resistance of nJFET T2 and the RC time constant of ESD power clamp circuit 100. Decreasing the channel length of nJFET T2, on the other hand, will decrease the channel resistance of nJFET T2. Therefore the RC time constant of ESD power clamp circuit 100 can thus be selected by selection of the channel length of nJFET T2.

Figure 2:
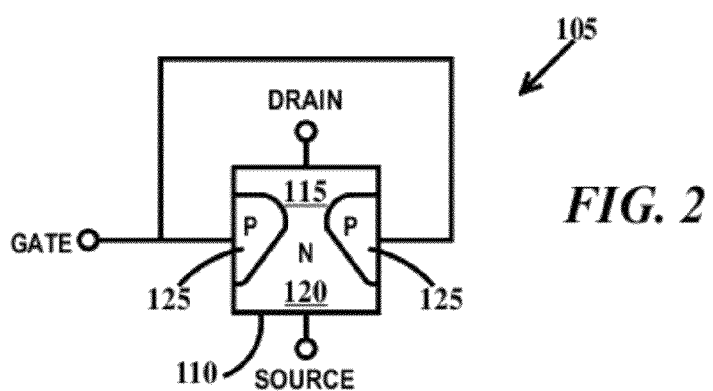
FIG. 2 is a diagram depicting the structure and features of a junction field effect transistor according to embodiments of the present invention.

FIG. 2 is a diagram depicting the structure and features of a junction field effect transistor according to embodiments of the present invention. In FIG. 2, a typical nJFET 105 includes an N-type body 110. Formed in N-type body 110 is an N-type drain 115, an N-type source 120 and P-type gates 125. The channel of nJFET 105 is the region of body 110 between source 115, drain 120 and gates 125. The internal diode is the PN junction between gate 125 (which is the cathode) and drain 120 (which is the anode).

Figure 3:
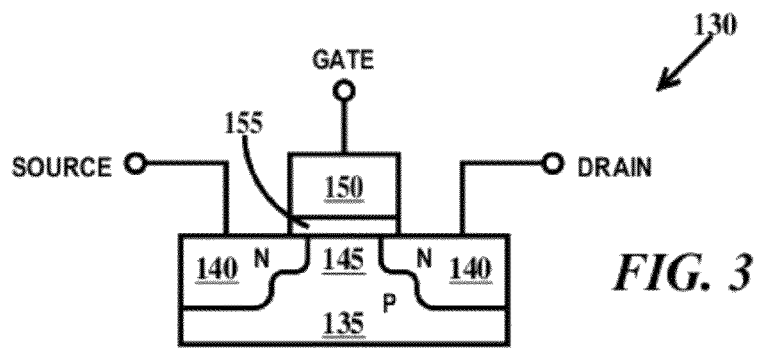
FIG. 3 is a diagram depicting the structure and features of a metal oxide field effect transistor according to embodiments of the present invention.

FIG. 3 is a diagram depicting the structure and features of a metal oxide field effect transistor according to embodiments of the present invention. In FIG. 3, a typical NFET 130 includes a body 135. Formed in body 135 are source/drains 140 on opposite sides of a channel region 145 of body 135. A gate electrode 150 (e.g., metal or polysilicon) is formed over channel region 145 and separated from channel region 145 by a gate dielectric layer 155. It should be noted that when the source and drain are tied together, an FET acts as a capacitor.

Figure 4:
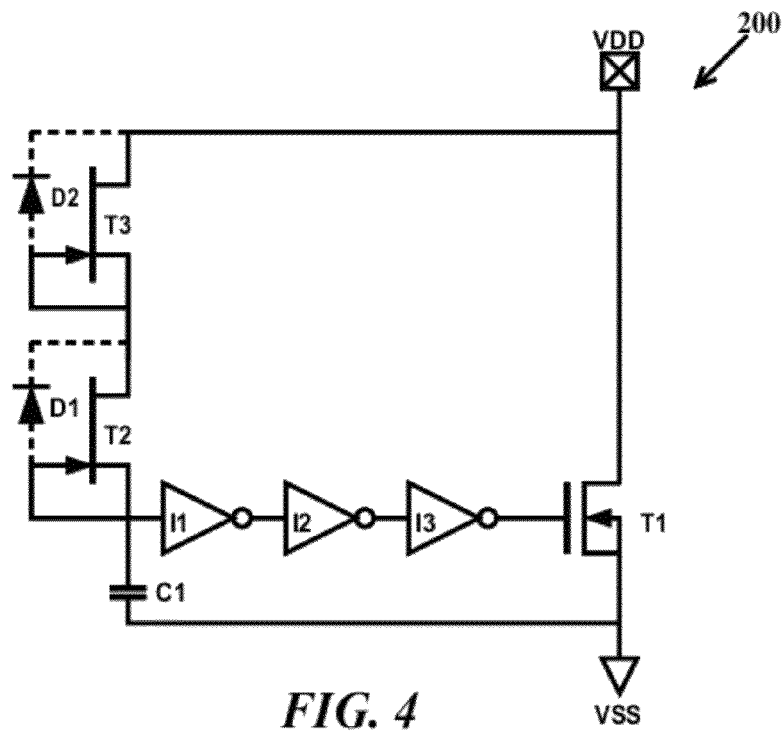
FIG. 4 is a circuit diagram of a second electrostatic discharge power clamp circuit according to a further embodiment of the present invention.

FIG. 4 is a circuit diagram of a second electrostatic discharge power clamp circuit according to a further embodiment of the present invention. In FIG. 4, an ESD power clamp circuit 200 is similar to ESD power clamp circuit 100 of FIG. 1 except the trigger circuit is embodied with an additional JFET, nJFET T3 and the connections of nJFET T2 are slightly modified. The drain of nJFET T2 is now connected to the source and gate of nJFET T3 instead of directly to VDD. nJFET T3 includes its own internal diode D2. The drain of nJFET T3 is connected to VDD. Circuit wise the cathode of diode D1 is connected to the gate and source of nJFET T3 instead of directly to VDD, the anode of diode D2 is connected to the cathode of diode D1 and the cathode of diode D3 is connected to VDD. The addition of nJFET T3 increases the resistance of the RC trigger circuit 200 over the ESD power clamp circuit 100 of FIG. 1. The operation of ESD power clamp circuit 200 is similar to that of ESD power clamp circuit 100 of FIG. 1. While two nJFETs are illustrated more than two nJFETs may be connected in series. FIG. 4 illustrates a method of designing the resistance of the RC trigger circuit at the circuit level rather than the device level which allows increased range of control of the nJFET channel resistance and thus the RC time constant of the RC network of the ESD power clamp circuit.

Figure 5:
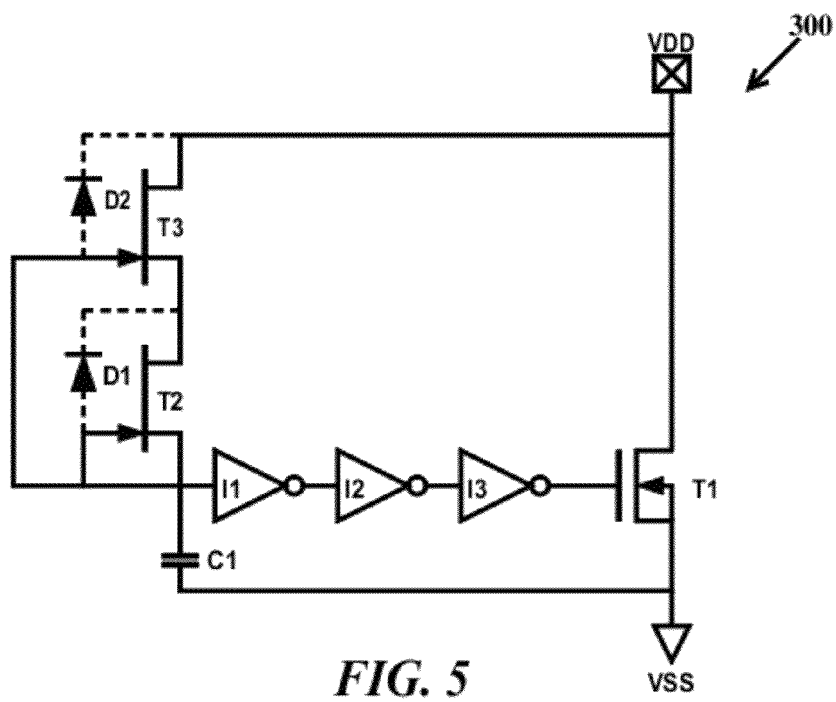
FIG. 5 is a circuit diagram of a third circuit according to a further embodiment of the present invention.

FIG. 5 is a circuit diagram of a third electrostatic discharge power clamp circuit according to a further embodiment of the present invention. In FIG. 5, an ESD power clamp circuit 300 is similar to ESD power clamp circuit 200 of FIG. 2 except instead of connecting the gate of nJFET T3 to the source of nJFET T3, the gate of nJFET T3 is connected to the first plate of capacitor C1. This increases the resistance of the RC trigger circuit 300 over the ESD power clamp circuit 200 of FIG. 4 because in this configuration the gate of nJFET T3 is more negatively biased than the source of nJFET T3 and thus the conductivity of the channel of nJFET T3 is lowered. The operation of ESD power clamp circuit 200 is similar to that of ESD power clamp circuit 100 of FIG. 1. Again, while two nJFETs are illustrated more than two nJFETs may be connected in series with the gate of each nJFET of the series connected to the first plate of capacitor C1. FIG. 5 illustrates another method of designing the resistance of the RC trigger circuit at the circuit level rather than the device level which allows increased range of control of the nJFET channel resistance and thus the RC time constant of the RC network of the ESD power clamp circuit.

Figure 6:
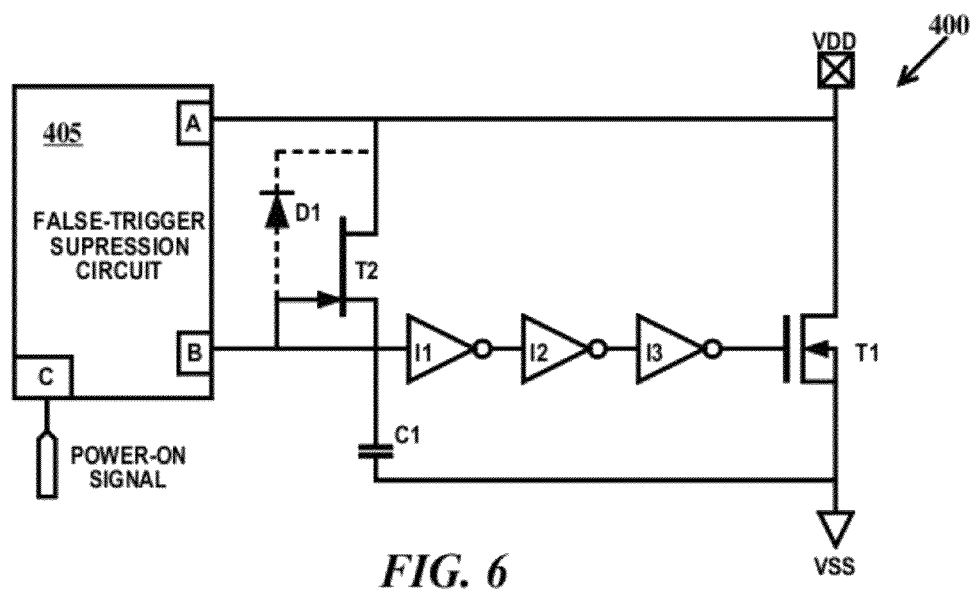
FIG. 6 is a circuit diagram of the electrostatic discharge power clamp circuit according of FIG. 1 having a false-trigger suppression circuit.

FIG. 6 is a circuit diagram of the electrostatic discharge power clamp circuit according of FIG. 1 including a false-trigger suppression circuit. In FIG. 6, an ESD power clamp circuit 400 is similar to ESD power clamp circuit 100 of FIG. 1 except a first input (pin A) of false-trigger suppression circuit 405 is connected to the drain of nJFET T2 and a first output (pin B) of false-trigger suppression circuit 405 is connected to the gate and source of nJFET T2. A second input (pin C) of false-trigger suppression circuit 405 is connected to a power-on signal. False-trigger suppression circuit 405 shorts out nJFET T2 by providing an additional low resistance path when power is applied to the VDD pad and the power-on signal is asserted (i.e., during normal operation). With nJFET T2 bypassed, capacitor C1 maintains at the same voltage as VDD and NFET T1 will not turn on. Any other combination of VDD and power-on signal allows NFET T1 to turn on.

Figure 7:
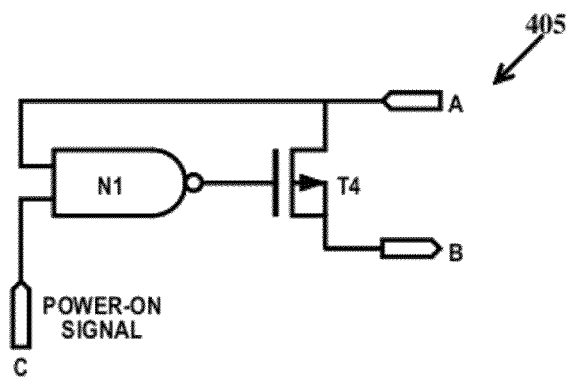
FIG. 7 is a circuit diagram of an exemplary false-trigger suppression circuit according to embodiments of the present invention.

FIG. 7 is a circuit diagram of an exemplary false-trigger suppression circuit according to embodiments of the present invention. In FIG. 7, false-trigger suppression circuit 405 comprises a NAND gate N1 and a p-channel FET (PFET) T4. A first input (A) of false-trigger suppression circuit 405 is connected to the source of PFET T4 and a first input of NAND gate N1. A second input (C) of false-trigger suppression circuit 405 is connected to a second input of NAND gate N1. The output of NAND gate N1 is connected to the gate of PFET T4. The drain and body of PFET T4 are connected to the output (B) of false-trigger suppression circuit 405. Resistance between input (A) and output (B) will be low only when both inputs (A) and (C) are asserted high.

Returning to FIG. 4, it should be apparent that buffer circuit 405 of FIG. 6 may be connected to ESD power clamp circuit 200. Pin A would be connected the drain of nJFET T3 and the VDD pad and pin B would be connected to the gate and source of nJFET T2.

Returning to FIG. 6, it should be apparent that buffer circuit 405 of FIG. 6 may be connected to ESD power clamp circuit 300. Pin A would be connected to the drain of nJFET T3 and the VDD pad and pin B would be connected to the gate and source of nJFET T2.

Thus, the ESD power clamp circuits of the embodiments of the present invention provide ESD protection with a minimal time to reset that are less sensitive to noise causing false triggers than conventional ESD power clamp circuits.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. An electrostatic discharge (ESD) power clamp circuit, comprising:
   a trigger circuit comprising a junction field effect transistor (JFET) and a capacitor;
   a buffer circuit having a single input;
   said JFET connected between a power pad and directly to a first plate of said capacitor and directly connected to said single input of said buffer circuit, said input of said buffer circuit connected to said first plate of said capacitor;
   said JFET having a single internal diode, a cathode of said internal diode connected to said power pad and an anode of said single internal diode connected to a gate of said JFET;
   a current by-pass device connected between said power pad and ground and to an output of said buffer circuit;
   a second plate of said capacitor connected to ground; and
   a false-trigger suppression circuit connected between a gate of said JFET and a drain of said JFET, said false trigger suppression circuit comprising a NAND gate having a first input, a second input and an output, said second input of said NAND gate connected to a pin configured to receive a power-on-signal and a p-channel field effect transistor (PFET), a gate of said PFET connected to said output of said NAND gate, a source of said PFET connected to said first input of said NAND gate, said drain of said JFET and to said power pad, a drain and body of said PFET connected to said gate of said JFET, said input of said buffer circuit and to said first plate of said capacitor.

2. The ESD power clamp circuit of claim 1, wherein said current by-pass device comprises an n-channel field effect transistor (NFET), a drain of said NFET connected to VDD and a source and body of said NFET connected to ground and to said second plate of said capacitor, and a gate of said NFET connected to an output of said buffer circuit.

3. The ESD power clamp circuit of claim 1, wherein said buffer circuit comprises a set of one or more inverters connected in series, an input of a subsequent inverter of said set of one or more inverters connected to an output of a previous inverter of said set of one or more inverters, the input of a first inverter of said set of one or more inverters being the input of said buffer circuit and the out of a last inverter of said set of one or more inverters being the output of said buffer circuit.

4. The ESD power clamp circuit of claim 1, wherein said JFET is a single n-channel JFET (nJFET), a drain of said nJFET connected to said power pad, a gate of said nJFET connected to said source of said nJFET, to said first plate of said capacitor and to said input of said buffer circuit.

5. The ESD power clamp circuit of claim 1, wherein said capacitor is a plate capacitor or said capacitor is formed from an FET.

6. A method, comprising:
  providing an electrostatic discharge (ESD) power clamp circuit, comprising:
    a trigger circuit comprising a junction field effect transistor (JFET) and a capacitor;
    a buffer circuit having a single input;
    said JFET connected between a power pad and directly to a first plate of said capacitor and directly connected to said single input of said buffer circuit, said input of said buffer circuit connected to said first plate of said capacitor;
    said JFET having a single internal diode, a cathode of said internal diode connected to said power pad and an anode of said single internal diode connected to a gate of said JFET;
    a current by-pass device connected between said power pad and ground and to an output of said buffer circuit and to a second plate of said capacitor;
    a second plate of said capacitor connected to ground; and
    a false-trigger suppression circuit connected between a gate of said JFET and a drain of said JFET, said false trigger suppression circuit comprising a NAND gate having a first input, a second input and an output, said second input of said NAND gate connected to a pin configured to receive a power-on-signal and a p-channel field effect transistor (PFET), a gate of said PFET connected to said output of said NAND gate, a source of said PFET connected to said first input of said NAND gate, said drain of said JFET and to said power pad, a drain and body of said PFET connected to said gate of said JFET, said input of said buffer circuit and to said first plate of said capacitor;
  charging said capacitor during an ESD event, said charged capacitor turning on said current by-pass device to discharge current from said power pad to ground during said ESD event; and
  discharging said capacitor through said single internal diode of said JFET to said power pad when said ESD event ends.

7. The ESD power circuit of claim 1, wherein said JFET is an n-channel JFET.

8. The method of claim 6, wherein said wherein said current by-pass device comprises an n-channel field effect transistor (NFET), a drain of said NFET connected to VDD and a source and body of said NFET connected to ground and to said second plate of said capacitor, and a gate of said NFET connected to an output of said buffer circuit.

9. The method of claim 6, wherein said buffer circuit comprises a set of one or more inverters connected in series, an input of a subsequent inverter of said set of one or more inverters connected to an output of a previous inverter of said set of one or more inverters, the input of a first inverter of said set of one or more inverters being the input of said buffer circuit and the out of a last inverter of said set of one or more inverters being the output of said buffer circuit.

10. The method of claim 6, wherein said JFET is an n-channel JFET (nJFET), a drain of said nJFET connected to said power pad, a gate of said nJFET connected to said source of said nJFET, to said first plate of said capacitor and to said input of said buffer circuit.

11. An electrostatic discharge (ESD) power clamp circuit, comprising:
  a trigger circuit comprising a junction field effect transistor (JFET) and a capacitor;
  a buffer circuit having a single input;
  said JFET connected between a power pad and directly to a first plate of said capacitor and directly connected to said single input of said buffer circuit, said input of said buffer circuit connected to said first plate of said capacitor;
  said JFET having a single internal diode, a cathode of said internal diode connected to said power pad and an anode of said single internal diode connected to a gate of said JFET;
  said JFET is a first nJFET of n n-channel JFETs (nJFETs) where n is an integer equal or greater than 2, said nJFETs connected in series from said first nJFET to said nth nJFET, a drain of a subsequent nJFET connected to a source of a previous n JFET, a drain of said nth nJFET connected to said power pad, a source of said first nJFET connected to said first plate of said capacitor and to said input of said buffer circuit, gates of each nJFET of said n nJFETs connected to respective and corresponding sources of said n nJFETs, each of said n nJFETs having a cathode of a respective internal diode connected to the gate of the nJFET and an anode of said respective internal diode connected to said drain of the nJFET, each nJFET of said two or more nJFETs having an internal diode, for each nJFET of said two or more nJFETs a cathode of the internal diode is connected to the drain of the nJFET and an anode of the internal diode is connected to the gate of the nJFET;
  a current by-pass device connected between said power pad and ground and to an output of said buffer circuit;
  a second plate of said capacitor connected to ground; and
  a false-trigger suppression circuit connected between a gate of said last nJFET and a drain and a gate of said first nJFET, said false trigger suppression circuit comprising a NAND gate having a first input, a second input and an output, said second input of said NAND gate connected to a pin configured to receive a power-on-signal and a p-channel field effect transistor (PFET), a gate of said PFET connected to said output of said NAND gate, a source of said PFET connected to said first input of said NAND gate, said drain of said nJFET and to said power pad, a drain and body of said PFET connected to said gate of said nJFET, said input of said buffer circuit and to said first plate of said capacitor.

12. An electrostatic discharge (ESD) power clamp circuit, comprising:
  a trigger circuit comprising a junction field effect transistor (JFET) and a capacitor;
  a buffer circuit having a single input;
  said JFET connected between a power pad and directly to a first plate of said capacitor and directly connected to said single input of said buffer circuit, said input of said buffer circuit connected to said first plate of said capacitor;
  said JFET having a single internal diode, a cathode of said internal diode connected to said power pad and an anode of said single internal diode connected to a gate of said JFET;
  said JFET is a first of n n-channel JFETs (nJFETs) nJFETs connected in series from said first nJFET to said nth nJFET, a drain of a subsequent nJFET connected to a source of a previous nJFET, a drain of said nth nJFET connected to said power pad, a source of said first nJFET connected to said first plate of said capacitor and to said input of said buffer circuit, gates of each nJFET of said n nJFETs directly connected to said first plate of said capacitor and to said input of said buffer circuit, each of said n nJFETs having a cathode of a respective internal diode connected to the gate of the nJFET and an anode of said respective internal diode connected to said drain of the nJFET, each nJFET of said two or more nJFETs having an internal diode, for each nJFET of said two or more nJFETs a cathode of the internal diode connected to the drain of the nJFET and an anode of the internal diode connected to the gate of the nJFET;

a current by-pass device connected between said power pad and ground and to an output of said buffer circuit;

a second plate of said capacitor connected to ground; and a false-trigger suppression circuit connected between a gate of said last nJFET and a drain and a gate of said first nJFET, said false trigger suppression circuit comprising a NAND gate having a first input, a second input and an output, said second input of said NAND gate connected to a pin configured to receive a power-on-signal and a p-channel field effect transistor (PFET), a gate of said PFET connected to said output of said NAND gate, a source of said PFET connected to said first input of said NAND gate, said drain of said nJFET and to said power pad, a drain and body of said PFET connected to said gate of said nJFET, said input of said buffer circuit and to said first plate of said capacitor.

* * * * *